(12) United States Patent
Glessner et al.

(10) Patent No.: US 12,085,027 B2
(45) Date of Patent: Sep. 10, 2024

(54) COMPRESSOR BLEED FOR GAS TURBINE ENGINE

(71) Applicant: General Electric Company, Schenectady, NY (US)

(72) Inventors: John Carl Glessner, Kings Mills, OH (US); Daniel John Oehrle, West Chester, OH (US); Mark Edward Linz, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 124 days.

(21) Appl. No.: 17/470,261

(22) Filed: Sep. 9, 2021

(65) Prior Publication Data
US 2023/0073647 A1 Mar. 9, 2023

(51) Int. Cl.
*F02C 9/18* (2006.01)

(52) U.S. Cl.
CPC ............ *F02C 9/18* (2013.01); *F05D 2220/32* (2013.01)

(58) Field of Classification Search
CPC ...................................... F02C 9/18; F02C 6/08
See application file for complete search history.

(56) References Cited

U.S. PATENT DOCUMENTS

| | | | |
|---|---|---|---|
| 4,064,692 A | 12/1977 | Johnson et al. | |
| 4,068,471 A | 1/1978 | Simmons | |
| 5,123,240 A | 6/1992 | Frost et al. | |
| 5,261,227 A | 11/1993 | Griffin, III | |
| 5,279,109 A | 1/1994 | Liu et al. | |
| 6,742,324 B2 | 6/2004 | Bachelder et al. | |
| 9,677,501 B2 | 6/2017 | Pierluissi et al. | |
| 9,845,768 B2 | 12/2017 | Pesyna et al. | |
| 10,208,676 B2 | 2/2019 | Johnson et al. | |
| 10,287,992 B2 | 5/2019 | Tan et al. | |
| 10,364,750 B2 | 7/2019 | Rambo | |
| 10,519,963 B2 | 12/2019 | Taylor et al. | |
| 10,550,700 B1 * | 2/2020 | Howarth | F01D 5/28 |
| 10,815,886 B2 | 10/2020 | Kroger et al. | |
| 2013/0040545 A1 | 2/2013 | Finney | |
| 2014/0263737 A1 | 9/2014 | Pierluissi et al. | |

* cited by examiner

*Primary Examiner* — Courtney D Heinle
*Assistant Examiner* — John S Hunter, Jr.
(74) *Attorney, Agent, or Firm* — Dority & Manning, P.A.

(57) ABSTRACT

A gas turbine engine includes a turbomachine defining a core flowpath extending through a first compressor and a second compressor, wherein a first compressor frame defines a compressor bypass passage extending from the core flowpath at the first compressor frame; and a forward compressor frame positioned between the first compressor and the second compressor, wherein the forward compressor frame defines at least in part a second portion of the core flowpath at a location downstream of the first portion of the core flowpath, wherein the forward compressor frame defines a compressor bleed passage extending from the core flowpath at a location downstream of the first compressor and upstream of the second compressor to egress a flow of air away from the core flowpath.

19 Claims, 8 Drawing Sheets

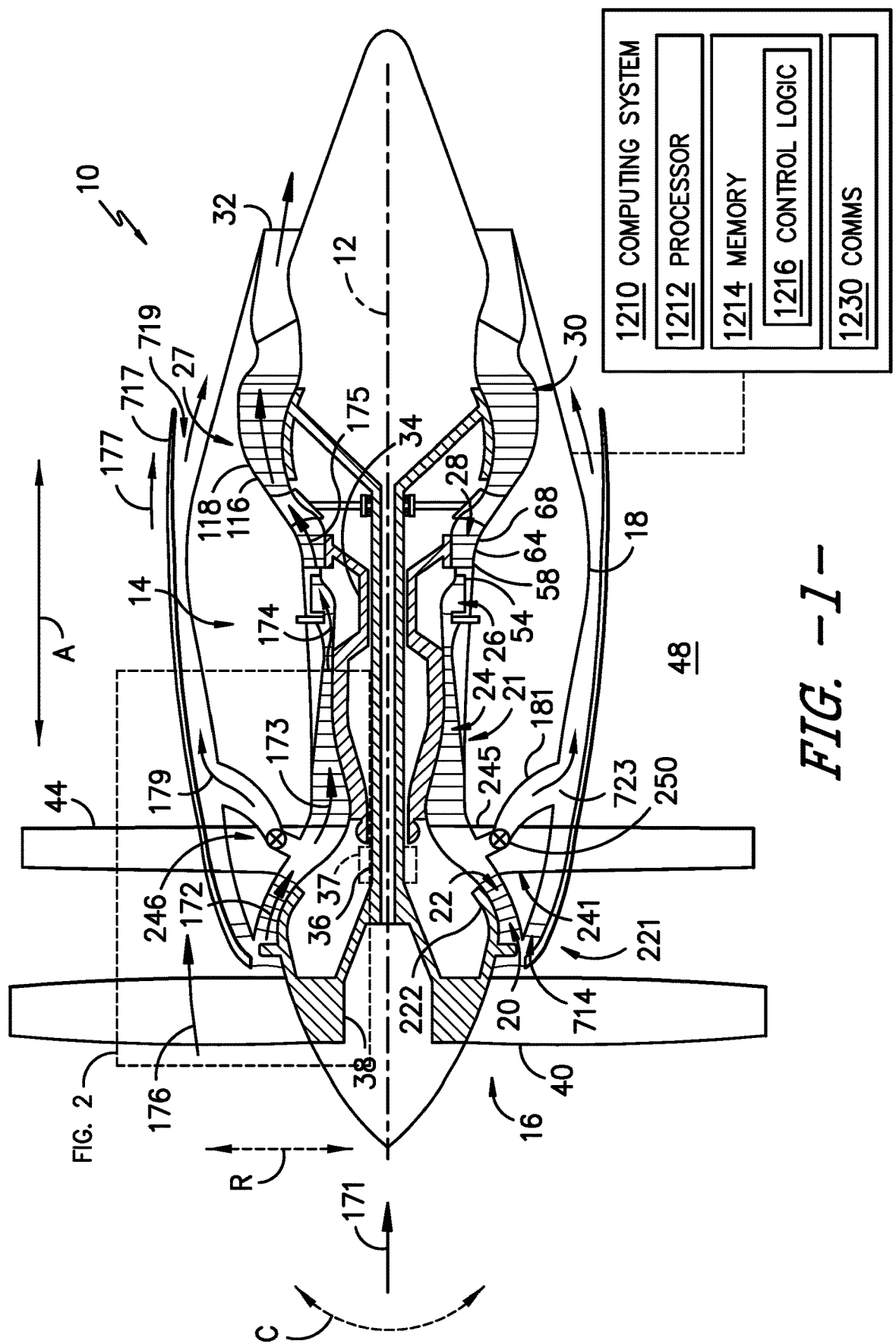
FIG. -1-

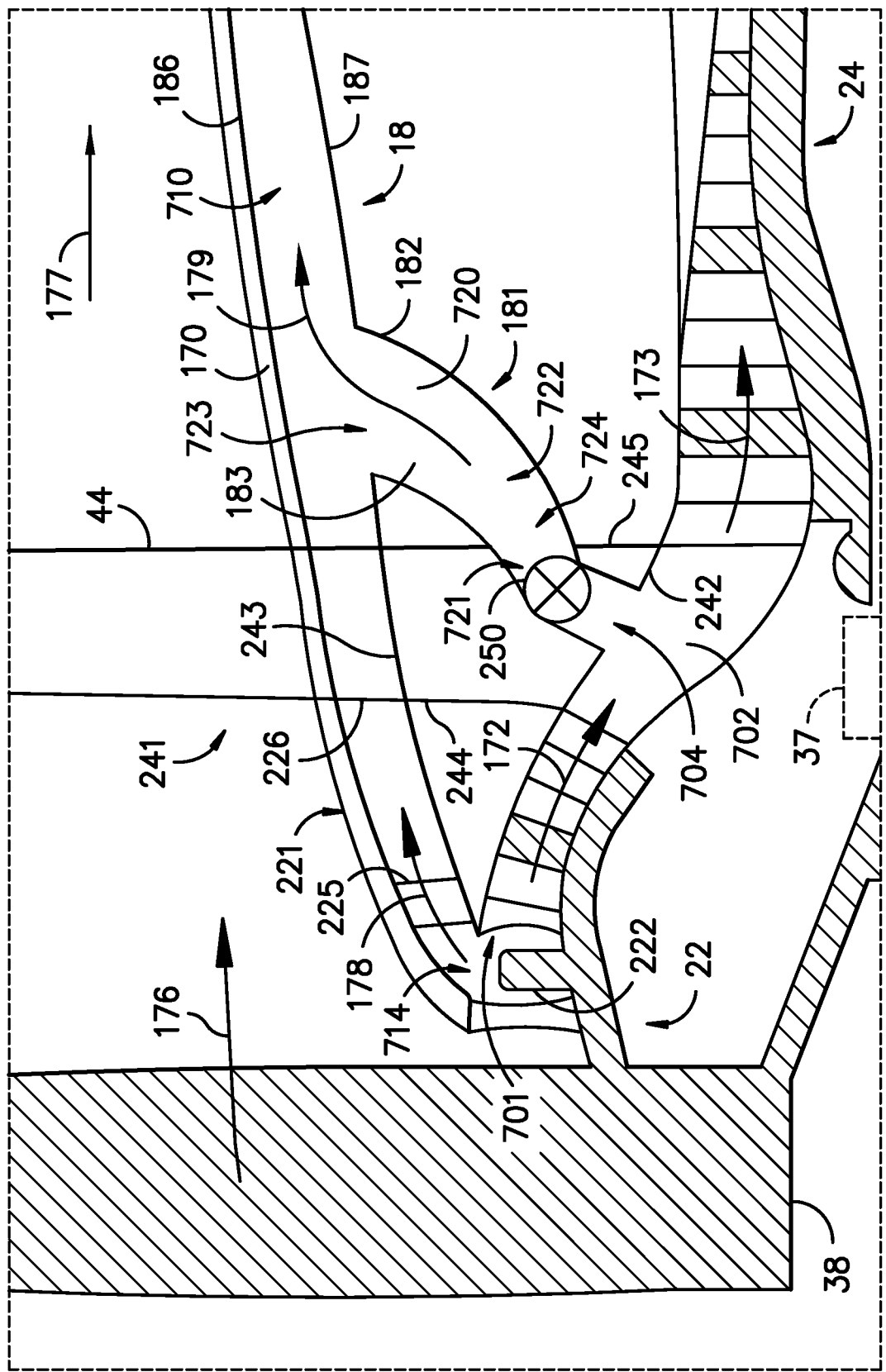
FIG. -2A-

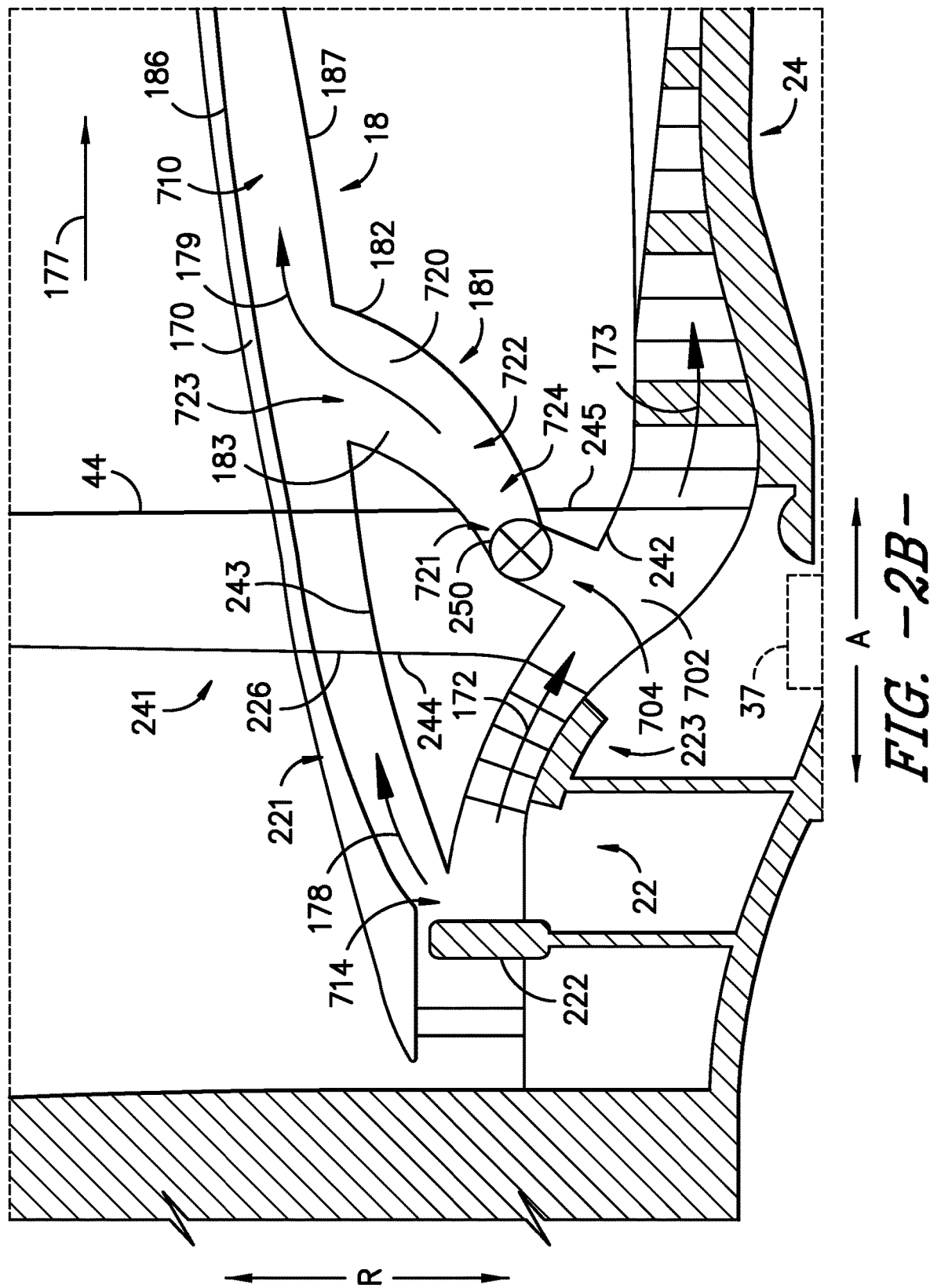
FIG. -2B-

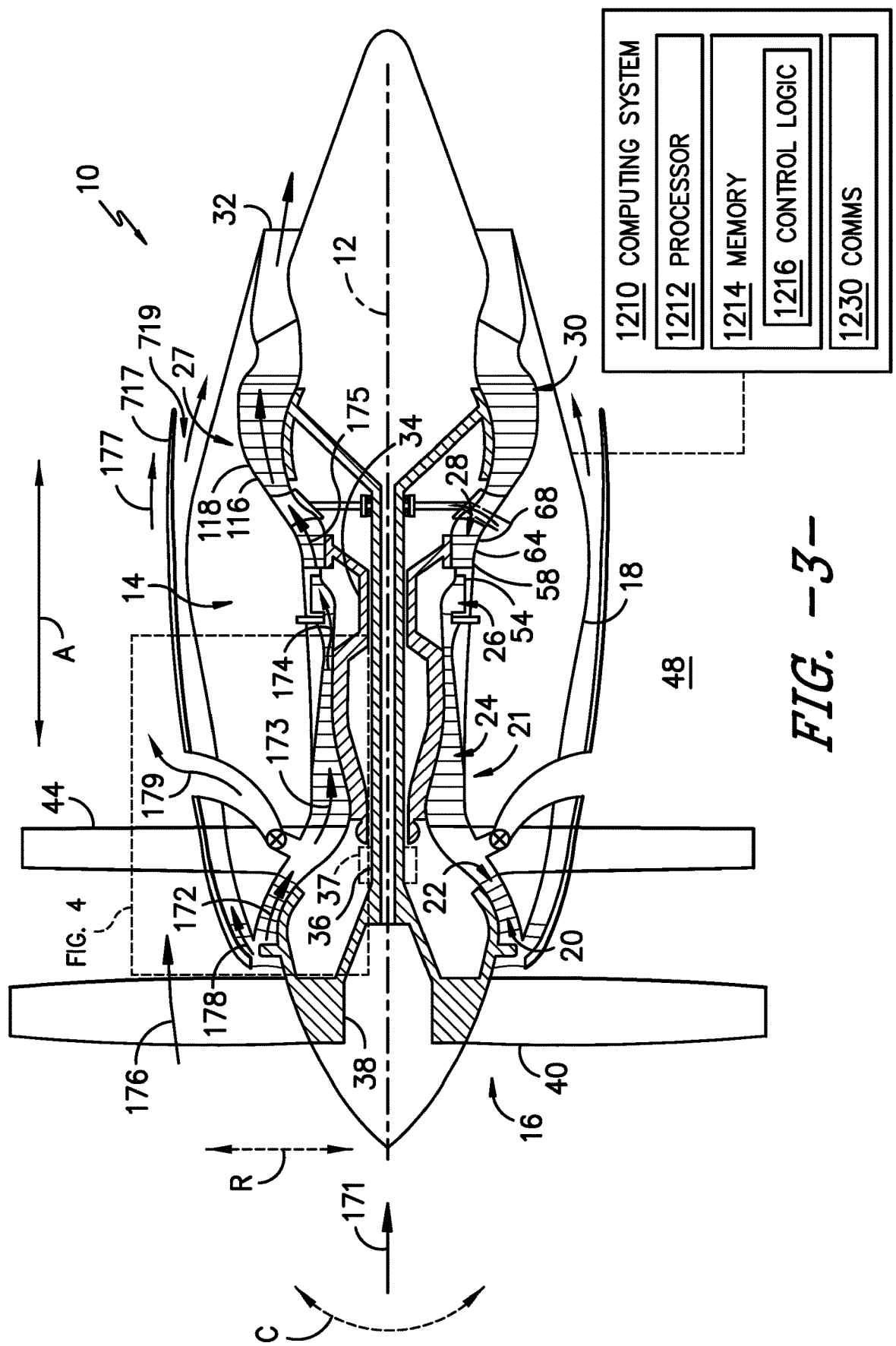
FIG. -3-

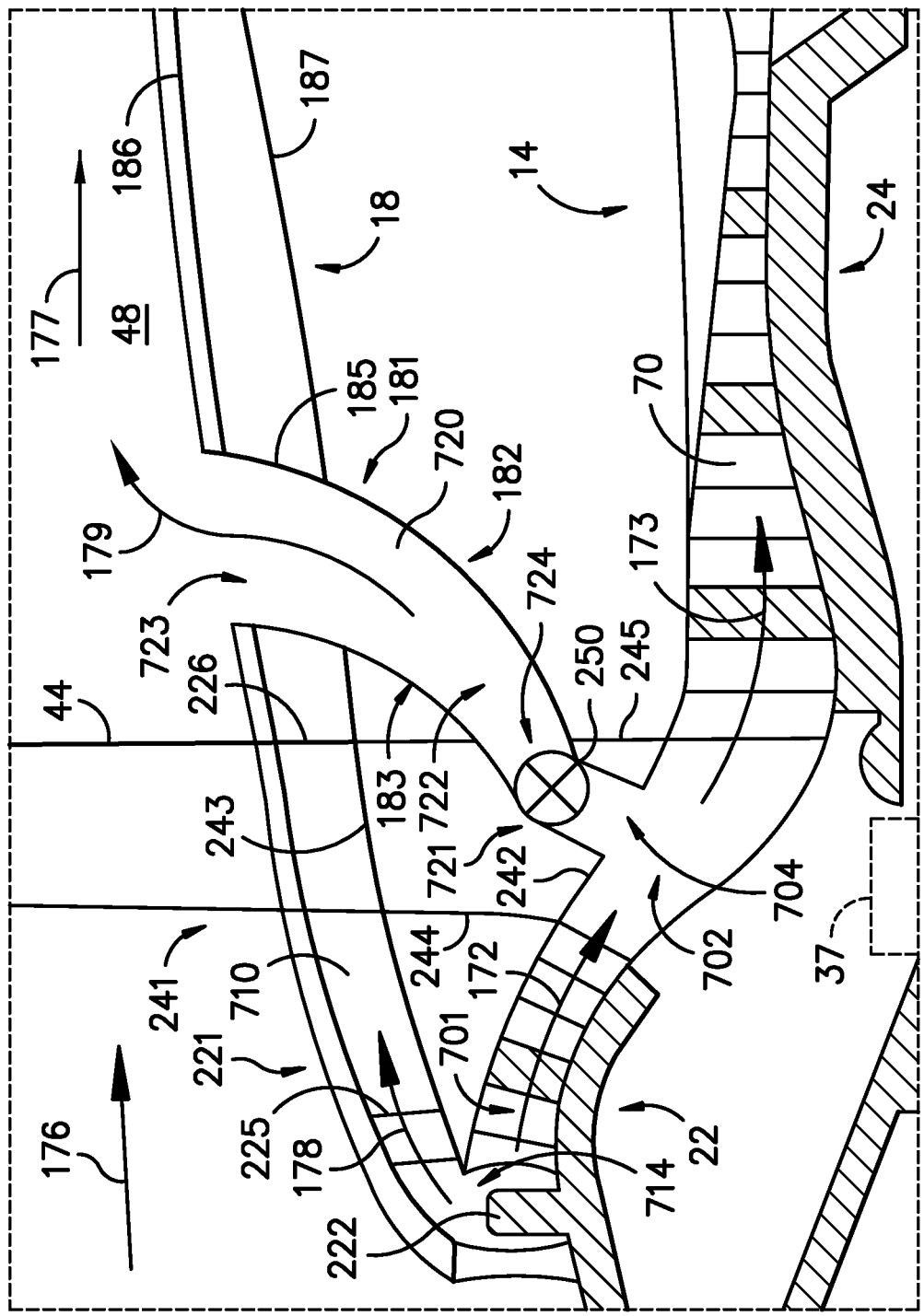
FIG. -4-

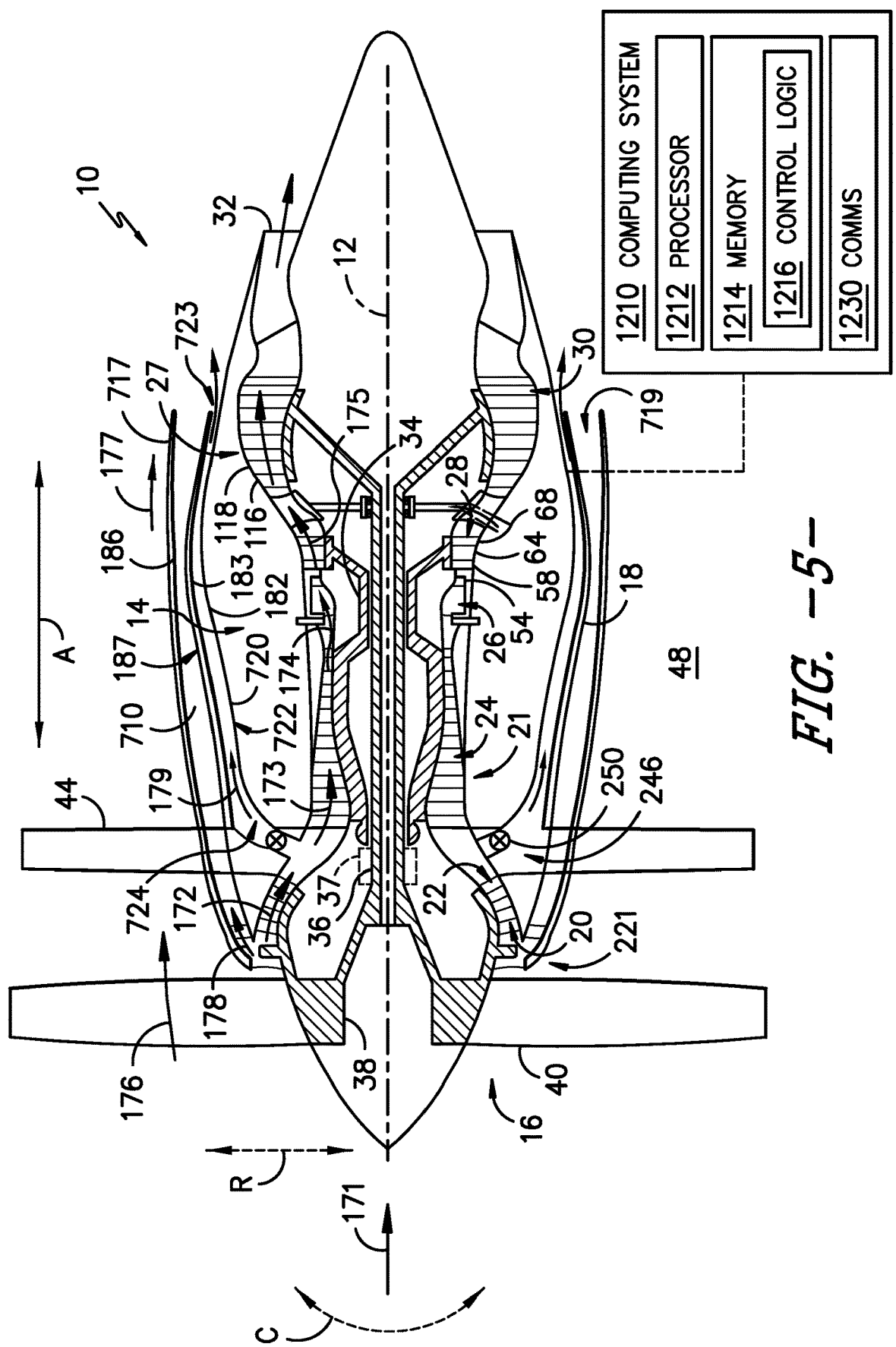
FIG. -5-

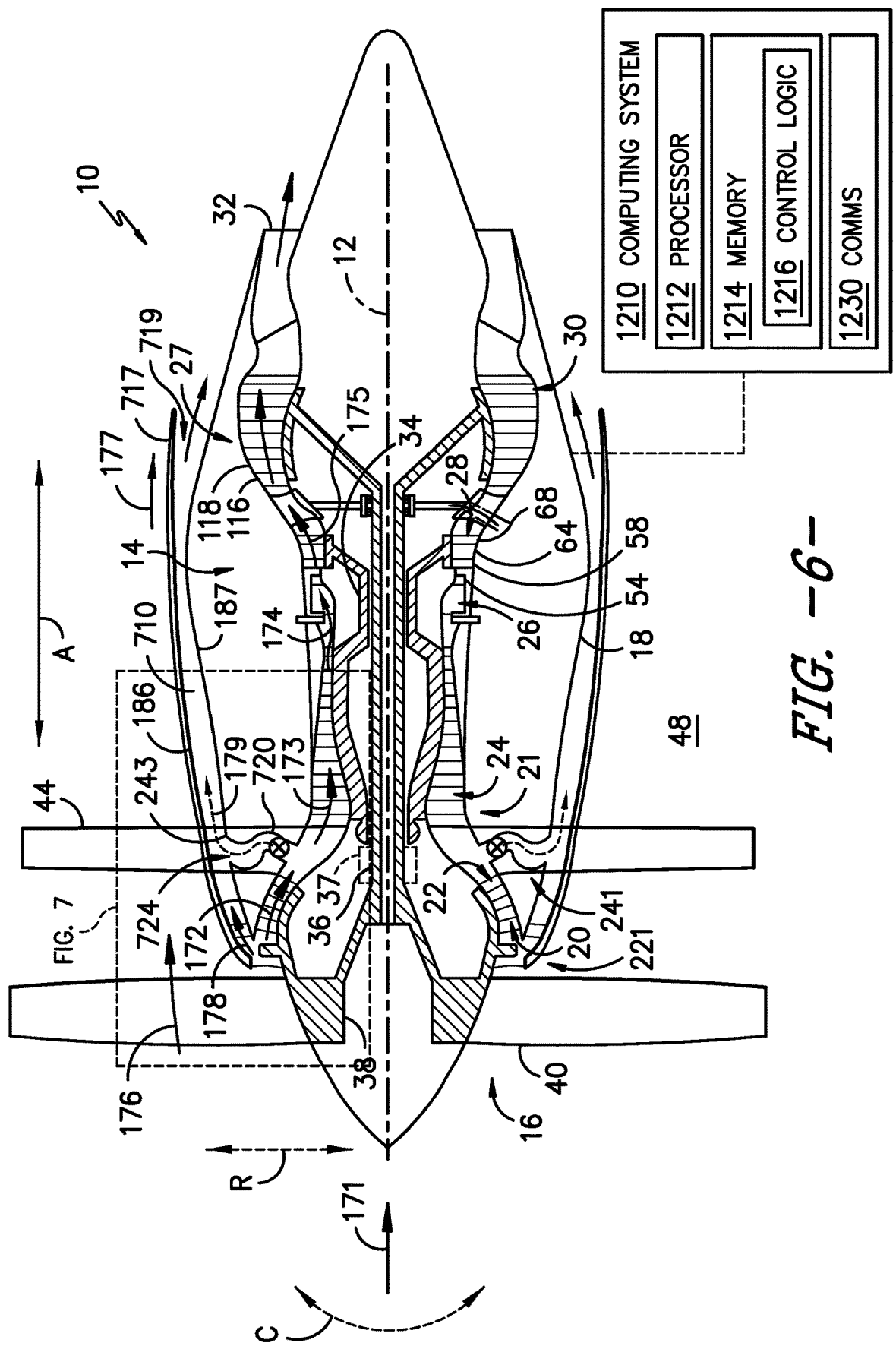
FIG. -6-

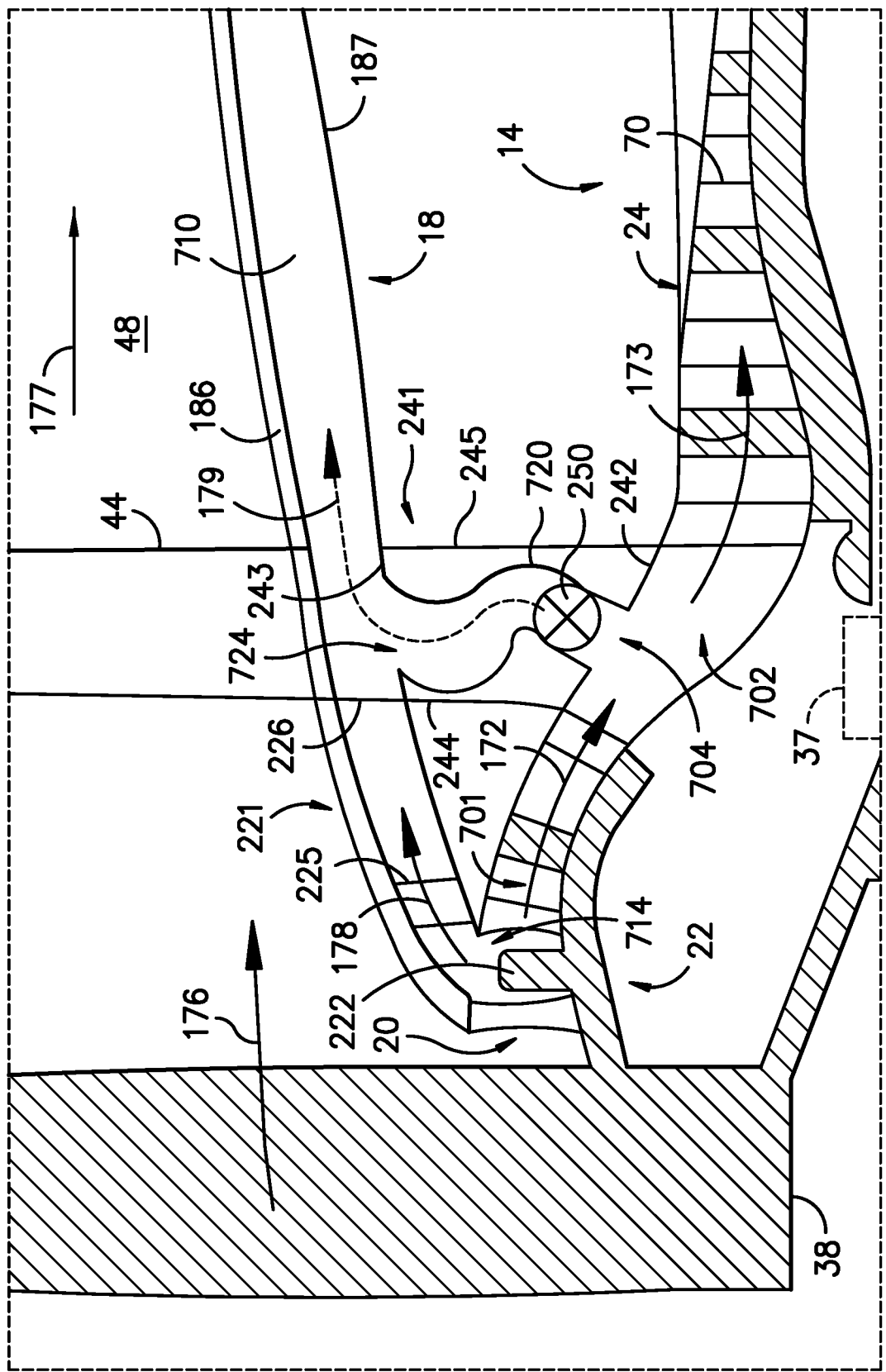
FIG. -7-

COMPRESSOR BLEED FOR GAS TURBINE ENGINE

FIELD

The present disclosure generally pertains to exhaust bleed passages for gas turbine engines, such as for adaptive cycle or three-stream gas turbine engines.

BACKGROUND

Gas turbine engines are challenged to improve efficiency and provide increasing levels of thrust output. Engines are further challenged to provide such benefits while maintaining or decreasing cross-sectional area or volume. While various structures are known for increasing thrust output and efficiency, such structures may be negated by larger cross-sectional areas of the engine.

Furthermore, gas turbine engines are challenged to maintain or improve operability during transient conditions, or conditions generally outside of a maximum efficiency point that may generally correspond to a cruise condition of a landing to takeoff flight cycle. Operating conditions outside of the design point may include compressor mismatch, which is when rotor speed, airflow rate, and rate of pressurization between stages of a compressor, or between two or more compressors, are such that stall or surge conditions may form due to magnitudes of air from one compressor stage that is unsuited for another compressor stage receiving the air.

As such, there is a need for a gas turbine engine having improved efficiency and thrust output, while also addressing issues related to cross-sectional area and maintaining engine operability.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 is a schematic cross-sectional view of an exemplary embodiment of a gas turbine engine in accordance with aspects of the present disclosure;

FIG. 2A is a detailed schematic cross-sectional view of a portion of the gas turbine engine of FIG. 1;

FIG. 2B is a detailed schematic cross-sectional view of a portion of a gas turbine engine in accordance with another exemplary embodiment of the present disclosure;

FIG. 3 is a schematic cross-sectional view of an exemplary embodiment of a gas turbine engine in accordance with aspects of the present disclosure;

FIG. 4 is a detailed schematic cross-sectional view of a portion of the gas turbine engine of FIG. 3;

FIG. 5 is a schematic cross-sectional view of an exemplary embodiment of a gas turbine engine in accordance with aspects of the present disclosure;

FIG. 6 is a schematic cross-sectional view of an exemplary embodiment of a gas turbine engine in accordance with aspects of the present disclosure; and FIG. 7 is a detailed schematic cross-sectional view of a portion of the gas turbine engine of FIG. 6.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

One or more components of the turbomachine engine described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Suitable powder materials for the manufacture of the structures provided herein as integral, unitary, structures include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

A "third stream" or third stream flowpath as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream.

Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

Various aspects of the present disclosure generally provide for a gas turbine engine having fan and a turbomachine, with the turbomachine comprising a first compressor and a second compressor, and defining a core flowpath through the first and second compressors. The gas turbine engine further defines a first bypass passage (e.g., a fan bypass passage) extending over the turbomachine, and a second bypass passage (e.g., a third stream) extending from a location downstream of at the first stage of compressor rotor blades of the first compressor and upstream of the second compressor, to the first bypass passage. As will be appreciated, the second bypass passage/third stream may allow for the engine to create additional thrust without increasing the size of the fan by capitalizing on some of the compression of the turbomachine while also potentially solving other issues, such as thermal management issues, of the turbomachine.

Further, aspects of the present disclosure further provide for structures facilitating the turbomachine to define a bleed passage extending from the compressor section to the second bypass passage/third stream, to the first bypass passage, or both, to ensure the gas turbine engine remains in a desirable operating condition, avoiding stall or surge within the compressor section.

Referring now to the drawings, FIG. 1 is a schematic cross-sectional view of an exemplary gas turbine engine 10 herein referred to as "engine 10" as may incorporate various embodiments of the present disclosure.

As shown in FIG. 1, the engine 10 defines a longitudinal or axial centerline axis 12 that extends therethrough for reference purposes. In general, the engine 10 may include a turbomachine 14 disposed downstream from a fan section 16.

The engine 10 includes a compressor section 21 in serial flow arrangement with a turbine section 27. The turbomachine 14 may generally include a substantially annular outer casing 18 that defines an annular core flowpath inlet 20. The outer casing 18 may be formed from multiple casings. The outer casing 18 encases, at least in part and in serial flow arrangement, the compressor section 21, a combustion section 26, and the turbine section 27. In a particular embodiment, the compressor section 21 includes a first compressor 22 forming a low speed compressor and a second compressor 24 forming a high speed compressor. In a still particular embodiment, the turbine section 27 includes a first turbine assembly or high speed turbine 28 and a second turbine assembly or low speed turbine 30 (e.g., including vanes 116 and rotor blades 118). A jet exhaust nozzle section 32 is positioned downstream of the turbine section 27. A high speed shaft or spool 34 drivingly connects the high speed turbine 28 to the second compressor 24. A low speed shaft or spool 36 drivingly connects the low speed turbine 30 to the first compressor 22. The low spool 36 may also be connected to a fan shaft or spool 38 of the fan section 16. In particular embodiments, the low spool 36 may be connected directly to the fan spool 38 such as in a direct-drive configuration. In alternative configurations, the low spool 36 may be connected to the fan spool 38 via a gear assembly 37 (as is depicted in phantom), so as to configure the engine 10 as an indirect-drive or geared-drive configuration allowing for a higher or lower rotational speed of the fan spool 38 versus the low speed spool 36. Such gear assemblies may be included between any suitable shafts/spools within engine 10 as desired or required.

Although depicted and described as a two-spool engine including the high speed spool separately rotatable from the low speed spool, it should be appreciated that the engine 10 may be configured as a three-spool engine including the high speed spool, the low speed spool, and a third spool or intermediate speed spool positioned in serial flow arrangement between the high speed spool and the low speed spool. Accordingly, the compressor section 21 may include an intermediate speed compressor separately rotatable from the high speed compressor and the low speed compressor. Similarly, the turbine section 27 may include a third turbine assembly or an intermediate speed turbine separately rotatable from the high speed turbine and the low speed turbine. The intermediate speed compressor and the intermediate speed turbine may together be coupled to form an intermediate speed spool fluidly between the high speed spool and the low speed spool.

It should further be appreciated that in certain embodiments the low speed turbine or second turbine assembly described herein generally refers to a separately rotatable spool downstream of the high speed turbine or first turbine assembly. As such, the second turbine assembly may be configured as an intermediate speed turbine or a low speed turbine positioned aft or downstream of the high speed turbine.

As shown in FIG. 1, the fan section 16 includes one or more axially-spaced stages of a plurality of fan blades 40 that are coupled to and that extend radially outwardly from the fan spool 38. The engine 10 is configured as an open rotor engine without a fan casing or nacelle surrounding the plurality of fan blades 40. The fan bypass passage 48 is formed downstream of the plurality of fan blades 40, or particularly downstream of a plurality of circumferentially-spaced outlet guide vanes 44, and radially outward of the outer portion of the turbomachine 14. A fan bypass passage 48 is formed downstream of one or more stages of the plurality of fan blades 40 and around an outer portion of the turbomachine 14. In a particular embodiment, such as depicted in FIG. 1, the fan bypass passage 48 is defined downstream of the guide vanes 44 and radially outward of the outer casing 18 surrounding the turbomachine 14.

It should be appreciated, however, that other embodiments of the engine may be configured as a turbofan engine having an annular fan casing or nacelle circumferentially surrounding the fan section and/or at least a portion of the core engine. With such a configuration, the nacelle may be configured to be supported relative to the core engine by the plurality of circumferentially-spaced outlet guide vanes, similar to guide vanes 44 in FIG. 1.

The engine 10 includes a computing system 1210 configured to perform operations. The computing system 1210 is communicatively coupled to the turbomachine 14 and/or a starter motor (not depicted) to adjust, modulate, maintain, change, or articulate any one or more control surfaces to generate the flows of air, one or more embodiments of the flow of heat transfer fluid, and/or a liquid and/or gaseous fuel in accordance with aspects of the present disclosure provided herein. The computing system 1210 can generally correspond to any suitable processor-based device, including one or more computing devices. Certain embodiments of the computing system 1210 include a full authority digital engine controller (FADEC), a digital engine controller (DEC), or other appropriate computing device configured to operate the engine 10.

The computing system 1210 may include one or more processors 1212 and one or more associated memory devices 1214 configured to perform a variety of computer-implemented functions, such as steps of the methods described herein. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 1214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD), non-transitory computer-readable media, and/or other suitable memory elements or combinations thereof.

The computing system 1210 may include control logic 1216 stored in the memory 1214. The control logic 1216 may include computer-readable instructions that, when executed by the one or more processors 1212, cause the one or more processors 1212 to perform operations. In still various embodiments, the memory 1214 may store charts, tables, functions, look ups, schedules etc. corresponding to the flows, or rates, pressures, or temperatures associated with the flows of air, heat transfer fluid, or fuel provided herein. The instructions can be software written in any suitable programming language or can be implemented in hardware. Additionally, and/or alternatively, the instructions can be executed in logically and/or virtually separate threads on the processor(s).

The computing system 1210 may also include a communications interface module 1230. In various embodiments, the communications interface module 1230 can include associated electronic circuitry that is used to send and receive data. As such, the communications interface module 1230 of the computing system 1210 can be used to receive data from one or more control surfaces, sensors, measurement devices, or instrumentation, or calculations or measurements corresponding to one or more portions of the engine 10 provided herein. The computing system(s) 1210 can also include a network interface used to communicate, for example, with the other components of engine 10. The network interface can include any suitable components for interfacing with one or more network(s), including for example, transmitters, receivers, ports, controllers, antennas, and/or other suitable components.

It should be appreciated that the communications interface module 1230 can be any combination of suitable wired and/or wireless communications interfaces and, thus, can be communicatively coupled to one or more components of the apparatus via a wired and/or wireless connection. As such, the computing system 1210 may obtain, determine, store, generate, transmit, or operate any one or more steps of the method described herein via a distributed network. For instance, the network can include a SATCOM network, ACARS network, ARINC network, SITA network, AVICOM network, a VHF network, a HF network, a Wi-Fi network, a WiMAX network, a gatelink network, etc.

Referring now to FIG. 2A, a detailed schematic view of a portion of the embodiment of the engine 10 depicted in FIG. 1 is provided. The turbomachine 14 includes the first compressor 22, such as the low speed compressor, and the second compressor 24, such as the high speed compressor, in serial flow arrangement relative to a flow of air 172 entering the core inlet 20 and flowing through a core flowpath 70 extended through the compressor section 21, the combustion section 26, the turbine section 27, and the jet exhaust nozzle section 32.

The first compressor 22 includes a first compressor frame 221 configured to support a first compressor rotor assembly 222 of the first compressor 22. It will be appreciated that although first compressor rotor assembly 222 is depicted and described as part of the first compressor 22 of the compressor section 21, in other embodiments, the first compressor rotor assembly 222 may refer generally to any rotatable stage of rotor blades downstream of the first stage of fan blades 40 and upstream of one or more compressors. In such a manner, it will be appreciated that the first compressor rotor assembly 222 may also be referred to as a second row of fan blades. In some embodiments the first compressor rotor assembly 222 may be regarded as a single stage compressor, which single stage may be a single fan, or a single fan with an output guide vane or an input guide vane immediately adjacent to the single fan.

Referring still to FIG. 2A, the first compressor frame 221 forms a first portion 701 of the core flowpath 70 located upstream of the second compressor 24. The first portion 701 of the core flowpath 70 extends in fluid communication with a second portion 702 of the core flowpath 70 formed by a forward compressor frame 241. The first compressor frame 221 forms a compressor bypass passage 710 having a compressor bypass inlet opening 714. The compressor bypass passage 710 is extended from the core flowpath 70 at the first compressor frame 221.

In certain embodiments, such as the embodiment of FIG. 2A, a first vane 225 is extended through compressor bypass passage 710. The first vane 225 may include any appropriate airfoil structure, and as such may include a pressure side, a suction side, a trailing edge, and a leading edge (not labeled). The first vane 225 may direct a flow of air, depicted schematically via arrows 178, through the compressor bypass passage 710. A plurality of the first vane 225 may be positioned in adjacent arrangement along the circumferential direction C, such as to change or alter a cross-sectional area of the compressor bypass passage 710 through which the flow of air 178 may move from the core flowpath 70 through the compressor bypass passage 710.

The compressor bypass passage 710 may be configured as a third stream, e.g., configured to allow an air stream to recover fluid energy to produce a portion of total thrust of the engine 10. During operation, a pressure ratio of the compressor bypass passage 710 may be higher than a pressure ratio at the fan bypass passage 48. In one embodiment, such as depicted in FIG. 1, the portion of total thrust produced through the compressor bypass passage 710 may include a dedicated exhaust nozzle 717 at an outlet end 719 (see FIG. 1).

It will be appreciated, however, that in another embodiment the portion of total thrust produced through the compressor bypass passage 710 may be mixed with the fan bypass passage 48. In still another embodiment, the portion of total thrust produced through the compressor bypass passage 710 may be mixed with the core flowpath 70 downstream of the combustion section 26, and egressed through the jet exhaust nozzle section 32.

Various embodiments of the compressor bypass passage 710 are configured to generate less than 50% of the total thrust of the engine 10. In certain embodiments, during operation the compressor bypass passage 710 is configured to generate 2% or more of the total thrust of the engine 10. In an embodiment, the engine 10 is configured to generate 2% or more of total thrust and up to 50% of total thrust at a takeoff condition, full load condition, or rated takeoff power condition. An exemplary rated takeoff power condition may be relative to sea level static flight at 86 degree Fahrenheit ambient temperature operating condition.

Referring now briefly to FIG. 2B, a close-up view of an alternative configuration of the compressor bypass passage 710 and first compressor rotor assembly 222 is depicted (also referred to as the mid-fan assembly). In the embodiment of FIG. 2B, the first compressor frame 221 forms the compressor bypass passage 710 having the compressor bypass inlet opening 714 located downstream of the first compressor rotor assembly 222 and upstream of a booster portion 223 of the low pressure compressor 22. With this configuration, as with the configuration of FIG. 2A, the first compressor rotor assembly 222 may provide a desired pressure rise for the flow of air, depicted schematically via arrows 178, provided through compressor bypass passage 710 from the first compressor rotor assembly 222. Such may facilitate a desired amount to thrust production from the air 178 through the compressor bypass passage 710, as noted above, and may further facilitate the placement of a heat exchanger in thermal communication with the air 178 through the bypass passage 710 (e.g., may allow the air 178 to experience a necessary amount of pressure drop across the heat exchanger, if included, while still providing a desired amount of thrust). In certain embodiments, a ratio of a radius of the fan blades 40 of the fan section 16 (i.e., a length from a tip of one of the fan blades 40 to the axial centerline axis 12 of the engine, see FIG. 1) to a radius of the first compressor rotor assembly 222 (i.e., a length from a tip of a fan blade of the first compressor rotor assembly 222 to the axial centerline axis 12 of the engine, see FIG. 1) may be greater than 1:1 and less than about 7:1, such as greater than about 1.1:1, greater than about 1.2:1, greater than about 1.5:1, or greater than about 2:1.

Referring back to FIG. 2A, the forward compressor frame 241 is positioned between the first compressor 22 and the second compressor 24. The forward compressor frame 241 forms a second portion 702 of the core flowpath 70 downstream of the first portion 701 of the core flowpath 70 formed by the first compressor frame 221. The forward compressor frame 241 defines a compressor bleed passage 720 having a compressor bleed inlet opening 704. The compressor bleed passage 720 is extended from the core flowpath 70 downstream of the first compressor 22 and upstream of the second compressor 24. The outlet guide vane 44 may be formed from, or attached to, the forward compressor frame 241. At least a portion of the outer casing 18 is attached to the forward compressor frame 241.

It will be appreciated, however, in other exemplary embodiments, the compressor bleed opening 704 may instead be defined forward of the forward compressor frame 241, or aft of the forward compressor frame 241, at an suitable location upstream of the high pressure compressor 24 and downstream of the first compressor rotor assembly 222.

In still certain embodiments, a second vane 226 is extended radially through the compressor bypass passage 710 downstream of the first vane 225 relative to the flow of air 178 through the compressor bypass passage 710. The second vane 226 may be formed by the forward compressor frame 241 and/or the outlet guide vane 44.

Referring to FIGS. 1-2, during operation of the engine 10, a flow of air 171 encounters the engine 10 from an upstream end 99. A portion of the flow of air 171, depicted schematically via arrows 176, bypasses the turbomachine 14 and flows across the fan blades 40. The flow of air 176 may generally be a large volume of air moved by the fan blades 40 as propulsive thrust. The flow of air 176 may be conditioned by the plurality of outlet guide vanes 44, such as to attenuate noise or adjust a vector of the flow of air to improve thrust output. The flow of air, depicted schematically via arrows 177, flows along the fan bypass passage 48 as generally the majority of propulsive thrust generated by the engine 10.

A portion of the flow of air 171, depicted schematically via arrows 172, enters the core flowpath 70 through the core inlet 20. A portion of the flow of air 172, depicted schematically via arrows 173, is compressed through the core flowpath 70 via succeeding stages of compressor rotor blades of the first compressor rotor assembly 222 (also referred to as a ducted mid-fan) and first compressor 22, and egresses the first compressor 22 toward the second compressor 24. Another portion of the flow of air 172, depicted schematically via arrows 178, enters the compressor bypass passage 710 and bypasses at least a portion of the second compressor 24 (and a portion of the first compressor 22 in the embodiment shown). In the embodiment depicted in FIG. 1, the compressor bypass passage 710 is extended from downstream of one or more stages of the first compressor rotor assembly 222 and upstream of the second compressor 24. As provided above, the flow of air 178 flows along the compressor bypass passage 710 as a substantial portion (e.g., between 2% and 50%) of the propulsive thrust generated by the engine 10.

In a particular embodiment, the outer casing 18 may include a first outer casing 186 forming (see FIG. 2A), at least in part, the fan bypass passage 48. The first outer casing 186 may generally be in fluid contact with the flow of air 177 through the fan bypass passage 48. The outer casing 18 may further include a second outer casing 187 (see FIG. 2A) also forming, at least in part, the compressor bypass passage 710 between the first outer casing 186 and the second outer casing 187. The first outer casing 186 and the second outer casing 187 may each extend substantially along the axial direction A, with the compressor bypass passage 710 also extended substantially along the axial direction A therethrough. The first outer casing 186 and the second outer casing 187 may each attach to the forward compressor frame 241. As used herein, the term "substantially along the axial direction" refers to extending further along the axial direction A than the radial direction R.

During operation of the engine 10, a portion of the flow of air 172 compressed by the first compressor 22 is selectively removed, egressed, or bled from the core flowpath 70 and flowed through the compressor bleed passage 720, such as depicted schematically via arrows 179. A flow control device 250 is positioned at the compressor bleed passage 720 to modulate or selectively allow the flow of air 179 through the compressor bleed passage 720 from the core flowpath 70. The flow control device 250 is configured to modulate an amount of the flow of air 179 based on an operating condition of the engine 10. The flow control device 250 may more particularly open or close in order to avoid stall or surge at the compressor section 21, or to limit the amount of the flow of air provided to the combustion section 26. The flow control device 250 may improve compressor matching by selectively allowing a portion of the relatively faster or greater flow of air 172 compressed by the first compressor 22 to be removed or dumped from the core flowpath 70 upstream of the second compressor 24. The reduced flow of air arriving at the second compressor 24, depicted schematically via arrows 173, may more suitably match the speed of the second compressor 24, to avoid compressor surge. The flow control device 250 may additionally improve compressor matching by closing the flow control device 250, to prevent the flow of air 179 from entering the compressor bleed passage 720, when the first compressor 22 and the second compressor 24 are each operating at speeds closer to their efficiency design point. If the compressor section 21 is at or approaching a stall condition, the flow control device 250 may close such as described above. Opening and closing the flow control device 250 may occur accordingly at startup conditions, shutdown conditions, idle conditions, or part load conditions generally, or transient conditions between two or more conditions, or transient conditions between the design point and any one or more conditions off-design point.

The flow control device 250 may be a valve or any appropriate device for regulating, directing, controlling, or otherwise modulating an amount of flow of fluid across a passage or flowpath. The flow control device 250 may include an actuated valve or an automatic valve driven by an electric energy source, a pneumatic energy source (e.g., air), or a fluid source (e.g., liquid and/or gaseous fuel, hydraulic fluid, lubricant, or combinations thereof). The flow control device 250 may include ball valves, shuttle valves, or other appropriate type of valve or flow regulating device in accordance with the embodiments depicted and described herein. Additionally, or alternatively, the flow control device 250 could be a plurality of devices. For example, the flow control device 250 could include a mechanism with one or more doors, moveable slot covers, butterfly valves, etc. These multiple items could be connected with any suitable structure (such as a sync ring), or they could be actuated individually. Accordingly, the flow control device 250 is configured to modulate the amount of flow of fluid through the compressor bleed passage 720.

The flow control device 250 may be operably connected to the computing system 1210. In such a manner, the computing system 1210 may be configured to open or close the flow control device 250 according to one or more flight schedules, in response to one or more sensed operating condition, etc.

In various embodiments such as further provided herein, the compressor bleed passage 720 routes the flow of air 179 through the compressor bleed inlet opening 704 and egresses or dumps the flow of air 179 away from the core flowpath 70 via a compressor bleed outlet opening 724. As such, the flow of air 179 is removed from the thermodynamic cycle with the combustion section 26. Unlike the compressor bypass passage 710 and the fan bypass passage 48, the compressor bleed passage 720 may provide little or no propulsive thrust.

Referring particularly to FIG. 2A, the first compressor frame 221 forms a first portion 711 of the compressor bypass passage 710 extended from the compressor bypass inlet opening 714 toward the forward compressor frame 241. The forward compressor frame 241 forms a second portion 712 of the compressor bypass passage 710 extended from the first portion 711 of the compressor bypass passage 710. The outer casing 18 forms, at least in part, a third portion 713 of the compressor bypass passage 710 extended from the second portion 712 of the compressor bypass passage 710. The compressor bypass passage 710 may form a substantially annular flowpath extended along the circumferential direction C (see FIG. 1) around the core flowpath 70 and extended along the axial direction A. Each portion 711, 712, 713 may be in substantially direct fluid communication with one another in serial flow arrangement. Accordingly, the first compressor frame 221 may attach directly to the forward compressor frame 241. Similarly, the forward compressor frame 241 may attach directly to the outer casing 18.

Referring still to FIG. 2A, the forward compressor frame 241 includes a first circumferential wall 242 forming an outer radius of the second portion 702 of the core flowpath 70. A second circumferential wall 243 forms an inner radius of the second portion 712 of the compressor bypass passage 710 downstream of the first portion 711 of the compressor bypass passage 710 formed by the first compressor frame 221. A first radial wall 244 and a second radial wall 245 are each extended along the radial direction R from the first circumferential wall 242 to the second circumferential wall 243. Additionally, the walls 242, 243, 244, 245 are extended along the circumferential direction C. The second radial wall 245 is positioned closer to the second compressor 24 than the first radial wall 244 and the first radial wall 244 is positioned closer to the first compressor 22 than the second radial wall 245. Stated differently, the first radial wall 244 is positioned closer to the upstream end 99 of the engine 10 in contrast to the second radial wall 245.

In various embodiments, the forward compressor frame 241 forms a first portion 721 of the compressor bleed passage 720 upstream of a second portion 722 of the compressor bleed passage 720. The second portion 722 of the compressor bleed passage 720 is formed, at least in part, by the outer casing 18. The compressor bleed outlet opening 724 is formed through the second radial wall 245 to allow for fluid communication of the flow of air 179 from the flow control device 250 to the second portion 722 of the compressor bleed passage 720. In certain embodiments, the second portion 722 of the compressor bleed passage 720 is a continuous, annular passage extended along the circumferential direction C. The bleed outlet opening 724 may accordingly be formed as an annular passage extended along the circumferential direction C. In other embodiments, the second portion 722 of the compressor bleed passage 720 is segmented into one or more arcs along the circumferential direction C. The bleed outlet opening 724 may accordingly be formed as one or more arcuate segments corresponding to the compressor bleed passage 720.

The outer casing 18 forms at least a portion of the second portion 722 of the compressor bleed passage 720. In a particular embodiment, the second portion 722 of the compressor bleed passage 720 is formed by a bleed duct 181 extended in fluid communication from first portion 721 of the compressor bleed passage 720 formed within the forward compressor frame 241. The bleed duct 181 may particularly extend from the bleed outlet opening 724 defined through the second radial wall 245.

In various embodiments, the bleed duct 181 includes an inner bleed duct wall 182 and an outer bleed duct wall 183. At least a portion of the bleed duct 181 may be formed at the outer casing 18. In certain embodiments, at least a portion of the bleed duct 181 is formed by the forward compressor frame 241 and extended from the second radial wall 245. In a particular embodiment, the outer bleed duct wall 183 is formed by the forward compressor frame 241. However, it should be appreciated that the outer bleed duct wall 183 and the inner bleed duct wall 182 may be formed by the outer casing 18.

Referring particularly to the embodiment depicted in FIG. 2A, the bleed outlet opening 724 allows for fluid communication from the forward compressor frame 241, or particularly from the flow control device 250, to the compressor bypass passage 710 via the compressor bleed passage 720. The bleed duct 181 interfaces with the bleed outlet opening 724 to fluidly connect the second portion 722 of the compressor bleed passage 720 to the compressor bypass passage 710. In the embodiment depicted, the compressor bleed passage 720 has a bleed passage outlet 723 positioned at a junction of the compressor bleed passage 720 and the compressor bypass passage 710. The bleed duct 181 may accordingly form the bleed passage outlet 723 as an annular passage, or as one or more discrete passages separated from one another along the circumferential direction C (see FIG. 1).

In certain embodiments, such as depicted in FIG. 1, the bleed passage outlet 723 is positioned downstream or aft of the forward compressor frame 241. In one embodiment, the bleed passage outlet 723 may be formed as a continuous, annular opening, such as corresponding to the compressor bleed passage 720. In another embodiment, the bleed passage outlet 723 may be formed as one or more arcuate segments along the circumferential direction C.

In certain embodiments, such as depicted in FIG. 1, a plenum 246 may be formed between the first radial wall 244, the second radial wall 245, the first circumferential wall 242, and the second circumferential wall 243. The plenum 246 may extend annularly along the circumferential direction C. The plenum 246 may alternatively be separated into circumferential arcs, segments, or sectors. The compressor bleed passage 720 may be in fluid communication with the plenum 246. The flow control device 250 may selectively allow the flow of air 179 to enter into the plenum 246, such as described above.

Referring now to FIG. 3, the embodiment of the engine 10 provided is configured substantially similarly as depicted and described above with respect to FIGS. 1-2. However, in the embodiment depicted in FIG. 3, and provided in further detail in FIG. 4, the compressor bleed passage 720 is fluidly connected to the fan bypass passage 48. For example, in the embodiment depicted, the bleed passage outlet 723 may allow for fluid communication of the plenum 246 to the fan bypass passage 48 via the compressor bleed passage 720.

The compressor bleed passage 720 more specifically has the bleed passage outlet 723 positioned at a junction of the compressor bleed passage 720 and the fan bypass passage 48. The bleed passage outlet 723 may be formed through the first outer casing 186 to allow for the flow of air 179 to egress from the compressor bleed passage 720 to the fan bypass passage 48. In particular embodiments, a strut 185 is extended along the radial direction R through the compressor bypass passage 710 (see FIG. 4). The compressor bleed passage 720 is extended through the strut 185 to allow for the flow of air 179 from the plenum 246 to the fan bypass passage 48. In particular, the strut 185 may allow for the flow of air 179 from the compressor bleed passage 720 to remain fluidly separate from the compressor bypass passage 710 as the flow egresses to the fan bypass passage 48. The outer bleed duct wall 183 and the inner bleed duct wall 182 each connects to the strut 185 to form a continuous compressor bleed passage 720 from the compressor bleed outlet opening 724 at the second radial wall 245 to the bleed passage outlet 723 at the first outer casing 186.

In various embodiments, the strut 185 may form an airfoil having a leading edge, a trailing edge, a pressure side, and a suction side (not labeled). The engine 10 may include a plurality of struts 185 forming airfoil vanes extended along the radial direction R and separated from one another along the circumferential direction C. The strut 185 may extend along the radial direction R from the first outer casing 186 to the second outer casing 187 through the compressor bypass passage 710. The strut 185 may extend through the compressor bypass passage 710 downstream or aft of the forward compressor frame 241. As such, the strut 185 may be positioned around the second compressor 24.

Referring now to FIG. 5, an embodiment of the engine 10 provided is configured substantially similarly as one or more of the embodiments depicted and described above with respect to FIGS. 1-4. However, in the embodiment depicted in FIG. 5, the bleed duct 181 is extended along the axial direction A from the forward compressor frame 241. In various embodiments, the bleed duct 181 surrounds the second compressor 24. In particular embodiments, the compressor bleed passage 720 is extended along the axial direction A to surround one or more of the combustion section 26, the turbine section 27, or the exhaust nozzle section 32, or portions thereof. The compressor bleed passage 720 may be formed by the inner bleed duct wall 182 and the outer bleed duct wall 183 each extended from the compressor bleed outlet opening 724 at the forward compressor frame 241, such as described above. The inner bleed duct wall 182 and the outer bleed duct wall 183 may each extend substantially along the axial direction A and the circumferential direction C to surround one or more of the combustion section 26, the turbine section 27, or the exhaust nozzle section 32 by the compressor bleed passage 720.

The bleed passage outlet 723 is formed at the downstream end of the compressor bleed passage 720. In FIG. 3, the bleed passage outlet 723 is formed at the outlet end 719 of the exhaust nozzle 717 of the compressor bypass passage 710. The bleed passage outlet 723 positioned accordingly may minimize or mitigate mixing of the flow of air 179 from the compressor bleed passage 720 with the flow of air 179 from the compressor bypass passage 710. Such configuration may minimize or mitigate adverse fluid interaction or back-flows associated with variable magnitudes of the flows of air 178, 179 through the respective passages 710, 720.

Referring now to FIG. 6, the embodiment of the engine 10 provided is configured substantially similarly as one or more of the embodiments depicted and described above with respect to FIGS. 1-5. However, in the embodiment of the engine 10 provided in FIG. 6, and depicted in further detail in FIG. 7, the compressor bleed outlet opening 724 is formed through the second circumferential wall 243 of the forward compressor frame 241. The compressor bleed outlet opening 724 positioned accordingly allows for fluid communication from the compressor bleed passage 720 to the compressor bypass passage 710. Furthermore, the forward compressor frame 241 forming the compressor bleed outlet opening 724 as provided herein allows for the forward compressor frame 241 to be formed as an integral, unitary, or monolithic structure, such as via additive manufacturing, forging, casting, or as a machined opening thereof. The forward compressor frame 241 may accordingly allow for fluid communication from the core flowpath 70 to the compressor bypass passage 710 via the compressor bleed passage 720 without a need for additional conduits, manifolds, or other components. Particular embodiments may form the compressor bleed passage 720 as a serpentine passage, allowing for desired pressure losses or differentials, or desired aerodynamic characteristics, of the flow of air 179 between the flow control device 750 and the compressor bypass passage 710.

It will be appreciated that although for the embodiment depicted, the compressor bleed outlet opening 724 is formed through the second circumferential wall 243 of the forward compressor frame 241, in other exemplary embodiments, the compressor bleed outlet opening 724 may exhaust into the compressor bypass passage 710 at any other suitable location, such as forward of the forward compressor frame 241, or aft of the forward compressor frame 241.

This written description uses examples to disclose the subject matter, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A gas turbine engine, the engine comprising: a turbomachine comprising a first compressor and a second compressor in serial flow arrangement, the turbomachine defining a core flowpath extending through the first compressor and the second compressor, wherein the first compressor comprises a first compressor rotor assembly and a first compressor frame configured to support the first compressor rotor assembly, wherein the first compressor frame defines at least in part a first portion of the core flowpath at a location upstream of the second compressor and in fluid communication with the second compressor, and wherein the first compressor frame defines a compressor bypass passage extending from the core flowpath at the first compressor frame; and a forward compressor frame positioned between the first compressor and the second compressor, wherein the forward compressor frame defines at least in part a second portion of the core flowpath at a location downstream of the first portion of the core flowpath, wherein the forward compressor frame defines a compressor bleed passage extending from the core flowpath at a location downstream of the first compressor and upstream of the second compressor to egress a flow of air away from the core flowpath.

The engine one or more of these clauses, wherein the forward compressor frame defines a bleed outlet opening, and wherein the compressor bleed passage extends through the bleed outlet opening to egress the flow of air away from the core flowpath.

The engine of one or more of these clauses, wherein the engine defines a radial direction, wherein the first compressor frame forms a first portion of the compressor bypass passage, wherein the forward compressor frame comprises: a first circumferential wall forming an outer radius of the second portion of the core flowpath; a second circumferential wall forming an inner radius of a second portion of the compressor bypass passage, the second portion of the compressor bypass passage located downstream of the first portion of the compressor bypass passage; and a second radial wall extended along the radial direction from the first circumferential wall to the second circumferential wall.

The engine of one or more of these clauses, wherein a compressor bleed outlet opening is defined through the second radial wall, and wherein a bleed duct extends from the compressor bleed outlet opening to the compressor bypass passage.

The engine of one or more of these clauses, wherein a bleed passage outlet is defined at a junction of the compressor bleed passage and the compressor bypass passage to egress the flow of air from the compressor bleed passage to the compressor bypass passage.

The engine of one or more of these clauses, wherein the bleed passage outlet is defined downstream of the forward compressor frame.

The engine of one or more of these clauses, wherein a compressor bleed outlet opening is defined through the second radial wall, and wherein a bleed duct extends from the compressor bleed outlet opening to allow fluid communication of the compressor bypass passage to a fan bypass passage.

The engine of one or more of these clauses, wherein a bleed passage outlet is defined at a junction of the compressor bleed passage and the fan bypass passage to egress the flow of air from the compressor bleed passage to the fan bypass passage.

The engine of one or more of these clauses, wherein the engine comprises: a strut extended through the compressor bypass passage to allow for fluid communication of the compressor bleed passage to the fan bypass passage.

The engine of one or more of these clauses, wherein the strut is extended through the compressor bypass passage aft of the forward compressor frame.

The engine of one or more of these clauses, wherein a compressor bleed outlet opening is defined through the second radial wall, and wherein a bleed duct extends along an axial direction from the compressor bleed outlet opening, and wherein the bleed duct surrounds one or more of the second compressor, a combustion section, or a turbine section of the engine.

The engine of one or more of these clauses, wherein a bleed passage outlet is formed at an outlet end of an exhaust nozzle of the compressor bypass passage.

The engine of one or more of these clauses, wherein a compressor bleed outlet opening is defined through the second circumferential wall to allow for fluid communication from the compressor bleed passage to the compressor bypass passage.

The engine of one or more of these clauses, wherein the forward compressor frame forms the compressor bleed passage as a serpentine passage.

The engine of one or more of these clauses, wherein the forward compressor frame is an integral, unitary structure.

The engine of one or more of these clauses, further comprising: a flow control device positioned at the compressor bleed passage, wherein the flow control device is configured to modulate an amount of air allowed into the compressor bleed passage from the core flowpath.

The engine of one or more of these clauses, wherein the engine is an open rotor engine configuration.

The engine of one or more of these clauses, the engine comprising: a fan section comprising a plurality of fan blades, wherein a fan bypass passage is defined downstream of the plurality of fan blades, and wherein the fan section comprises a plurality of outlet guide vanes extended from the forward compressor frame; and wherein the compressor bypass passage comprises an exhaust nozzle at an outlet end, and wherein the compressor bypass passage is configured to generate a pressure ratio at the compressor bypass passage higher than a pressure ratio at the fan bypass passage during operation of the engine.

The engine of one or more of these clauses, further comprising an outer casing surrounding the first and second compressors, wherein the outer casing comprises: a first outer casing forming, at least in part, a fan bypass passage; and a second outer casing forming, at least in part, the compressor bypass passage between the first outer casing and the second outer casing.

The engine of one or more of these clauses, wherein the first compressor frame comprises a first vane extended through the compressor bypass passage, and wherein the forward compressor frame comprises a second vane extended through the compressor bypass passage aft of the first vane.

What is claimed is:

1. A gas turbine engine, the engine comprising:
    a turbomachine comprising
        a first compressor and a second compressor in serial flow arrangement, the turbomachine defining a core flowpath extending through the first compressor and the second compressor, wherein the first compressor comprises a first compressor rotor assembly and a first compressor frame configured to support the first compressor rotor assembly, wherein the first compressor frame defines at least in part a first portion of the core flowpath at a location upstream of the second compressor and in fluid communication with the second compressor, and wherein the first compressor frame defines a compressor bypass passage extending from the core flowpath at the first compressor frame; and
        a forward compressor frame positioned between the first compressor and the second compressor, wherein the forward compressor frame defines at least in part a second portion of the core flowpath at a location downstream of the first portion of the core flowpath, wherein the forward compressor frame defines a compressor bleed passage extending from the core flowpath at a location downstream of the first compressor and upstream of the second compressor to egress a flow of air away from the core flowpath;
    wherein the engine is an open rotor engine configuration.

2. The engine of claim 1, wherein the forward compressor frame defines a bleed outlet opening, and wherein the compressor bleed passage extends through the bleed outlet opening to egress the flow of air away from the core flowpath.

3. The engine of claim 1, wherein the engine defines a radial direction, wherein the first compressor frame forms a first portion of the compressor bypass passage, wherein the forward compressor frame comprises:
a first circumferential wall forming an outer radius of the second portion of the core flowpath;
a second circumferential wall forming an inner radius of a second portion of the compressor bypass passage, the second portion of the compressor bypass passage located downstream of the first portion of the compressor bypass passage; and
a second radial wall extended along the radial direction from the first circumferential wall to the second circumferential wall.

4. The engine of claim 3, wherein a compressor bleed outlet opening is defined through the second radial wall, and wherein a bleed duct extends from the compressor bleed outlet opening to the compressor bypass passage.

5. The engine of claim 4, wherein a bleed passage outlet is defined at a junction of the compressor bleed passage and the compressor bypass passage to egress the flow of air from the compressor bleed passage to the compressor bypass passage.

6. The engine of claim 5, wherein the bleed passage outlet is defined downstream of the forward compressor frame.

7. The engine of claim 3, wherein a compressor bleed outlet opening is defined through the second radial wall, and wherein a bleed duct extends from the compressor bleed outlet opening to allow fluid communication of the compressor bypass passage to a fan bypass passage.

8. The engine of claim 7, wherein a bleed passage outlet is defined at a junction of the compressor bleed passage and the fan bypass passage to egress the flow of air from the compressor bleed passage to the fan bypass passage.

9. The engine of claim 8, wherein the engine comprises:
a strut extended through the compressor bypass passage to allow for fluid communication of the compressor bleed passage to the fan bypass passage.

10. The engine of claim 9, wherein the strut is extended through the compressor bypass passage aft of the forward compressor frame.

11. The engine of claim 3, wherein a compressor bleed outlet opening is defined through the second radial wall, and wherein a bleed duct extends along an axial direction from the compressor bleed outlet opening, and wherein the bleed duct surrounds one or more of the second compressor, a combustion section, or a turbine section of the engine.

12. The engine of claim 11, wherein a bleed passage outlet is formed at an outlet end of an exhaust nozzle of the compressor bypass passage.

13. The engine of claim 3, wherein a compressor bleed outlet opening is defined through the second circumferential wall to allow for fluid communication from the compressor bleed passage to the compressor bypass passage.

14. The engine of claim 13, wherein the forward compressor frame forms the compressor bleed passage as a serpentine passage.

15. The engine of claim 13, wherein the forward compressor frame is an integral, unitary structure.

16. The engine of claim 1, further comprising:
a flow control device positioned at the compressor bleed passage, wherein the flow control device is configured to modulate an amount of air allowed into the compressor bleed passage from the core flowpath.

17. The engine of claim 1, the engine comprising:
a fan section comprising a plurality of fan blades, wherein a fan bypass passage is defined downstream of the plurality of fan blades, and wherein the fan section comprises a plurality of outlet guide vanes extended from the forward compressor frame; and
wherein the compressor bypass passage comprises an exhaust nozzle at an outlet end, and wherein the compressor bypass passage is configured to generate a pressure ratio at the compressor bypass passage higher than a pressure ratio at the fan bypass passage during operation of the engine.

18. The engine of claim 1, further comprising an outer casing surrounding the first and second compressors, wherein the outer casing comprises:
a first outer casing forming, at least in part, a fan bypass passage; and
a second outer casing forming, at least in part, the compressor bypass passage between the first outer casing and the second outer casing.

19. The engine of claim 1, wherein the first compressor frame comprises a first vane extended through the compressor bypass passage, and wherein the forward compressor frame comprises a second vane extended through the compressor bypass passage aft of the first vane.

* * * * *